INVENTOR.
MARY ELLEN TENNYSON
BY
ATTORNEY

United States Patent Office 2,724,122
Patented Nov. 22, 1955

2,724,122
BED PAN

Mary Ellen Tennyson, Philadelphia, Pa.

Application March 6, 1953, Serial No. 340,703

3 Claims. (Cl. 4—113)

My invention relates to a bed pan which is manufactured of light weight, transparent plastic, which is resistant to acids, and which has a top section that is a soft cushion for comfort.

Heretofore, the bed pan in common use for bed ridden persons or those persons who have undergone an operation have been made of porcelain or stainless steel, and when used frequently produce an uncomfortable table, and painful pressure on the sacral region.

These complaints usually are made by chronic invalids and irritable, sensitive patients.

In the past there have been various pads of rubber and the like which may have been helpful but they were not practical or sanitary.

In addition I provide as an added convenience a means for measuring the urine output which is required in many urinary cases, or other diseases of the body.

It, therefore, is an object of my invention to provide a bed pan which may be readily cleaned and which is of one piece.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing in which.

Figure 1:
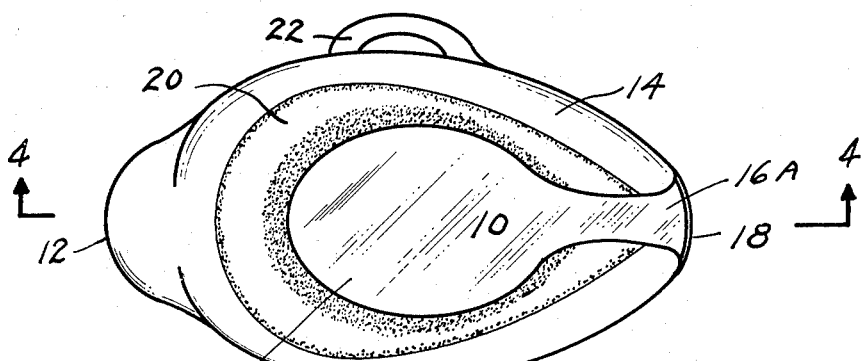
Fig. 1 is a top view of a bed pan embodying my invention.
Figure 2:
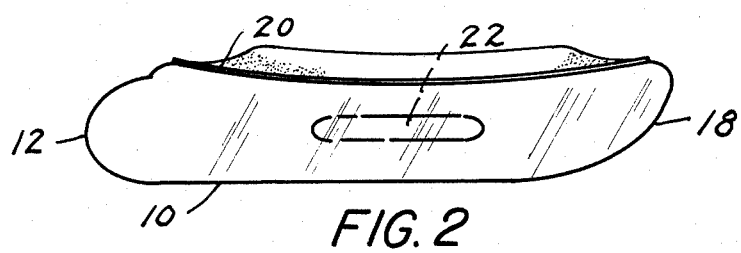
Fig. 2 is a side view of the bed pan embodying my invention.
Figure 3:
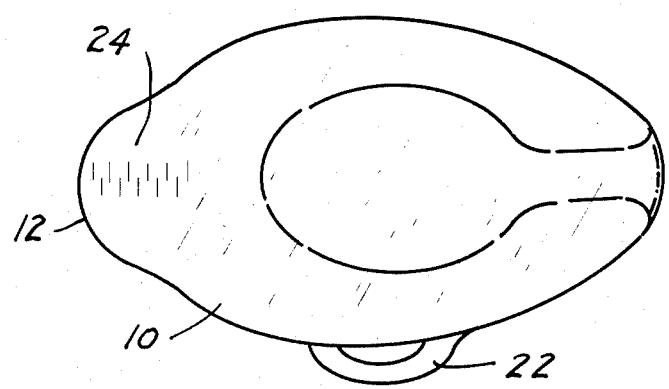
Fig. 3 is a bottom view of the bed pan embodying my invention.
Figure 4:
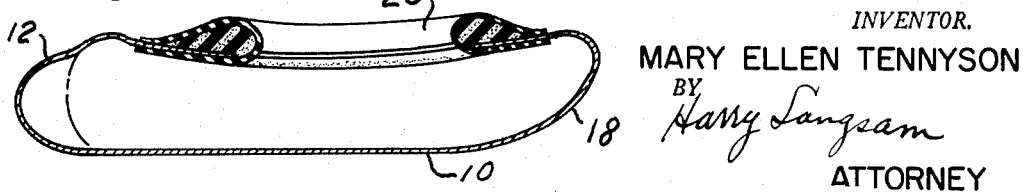
Fig. 4 is a sectional view taken along the line 4—4 of Fig. 1.

Referring now in greater detail to the drawing, I show a bed pan made of transparent plastic material such as those made from a methacrylate resin wherein there is a transparent bottom 10 a flare 12 at one end which is somewhat tapered to hold a predetermined quantity of urine, and which has a scale 24 to determine the quantity of liquid held within the flare.

A rim 14 partially closes the top to define an opening 16 and at the other end 18 the opening 16 narrows as at 16A, so that the contents may be easily poured from the interior of the pan.

The edge of the rim 14 has embodied therein a soft plastic cushion whereby a chronic invalid may be comfortably seated. The top or cover 20 is a pliable plastic material which encases a foam rubber cushion on the pan rim.

The edges of the cover 20 are heat sealed to the synthetic resin so that a unitary bed pan is created. When the pan is washed there are no unsightly edges to house germs or dirt so that the pan can be readily sterilized.

The nurse, technician or doctor can readily determine the quantity of urine deposited into the pan by holding the pan vertically and reading the graduations on the scale 24.

The side of the pan has a handle 22 whereby the pan may be readily and easily handled.

Although my invention has been described in considerable detail, such description is intended as being illustrative rather than limiting, since the invention may be variously embodied, and the scope of the invention is to be determined as claimed.

I claim as my invention:

1. A bed pan made of transparent plastic material, a rim at the top thereof, a soft plastic top integrally formed with said rim, and a cone-like end for measuring the liquid contents thereof.

2. A bed pan made of transparent plastic material, a rim at the top thereof, a soft plastic top on said rim, and a cone-like end for measuring the liquid contents thereof, all of the parts integrally formed to provide an easily washed unit.

3. A bed pan having a wall defining a chamber therein, said wall made of transparent plastic material, a rim at the top thereof, and a cone-like end adapted to measure the liquid contents within said chamber, said wall, rim, and cone-like end integrally formed together.

References Cited in the file of this patent

UNITED STATES PATENTS

| | | |
|---|---|---|
| 926,103 | Crater | June 29, 1909 |
| 2,132,651 | Schack | Oct. 11, 1938 |
| 2,188,844 | Pedersen | Jan. 30, 1940 |
| 2,304,631 | Ensing | Dec. 8, 1942 |
| 2,582,398 | Siegenthal | Jan. 15, 1952 |
| 2,591,850 | Mitchell | Apr. 8, 1952 |

FOREIGN PATENTS

| | | |
|---|---|---|
| 102,753 | Australia | Dec. 23, 1937 |